United States Patent [19]

Davis

[11] 4,286,520
[45] Sep. 1, 1981

[54] LINEAR EXPLOSIVE CHARGE WITH CONSTANT DETONATION VELOCITY AND SYNCHRONOUS BOOSTER CHARGES

[75] Inventor: Dallas R. Davis, Tulsa, Okla.

[73] Assignee: Davis Explosive Sources, Inc., Tulsa, Okla.

[21] Appl. No.: 65,893

[22] Filed: Aug. 13, 1979

[51] Int. Cl.³ ............................................. C06C 11/00
[52] U.S. Cl. ................................... 102/317; 181/116; 102/318
[58] Field of Search ................ 102/21.6, 22, 23, 24 R; 181/116; 403/185

[56] References Cited

U.S. PATENT DOCUMENTS

| | | | |
|---|---|---|---|
| 2,558,163 | 6/1951 | Wright et al. | 102/24 R |
| 2,755,878 | 7/1956 | Smith | 181/116 |
| 2,992,611 | 7/1961 | Felch | 181/116 X |
| 3,150,590 | 9/1964 | Silverman | 102/21.6 |
| 3,224,099 | 4/1966 | Lang et al. | 102/24 R X |
| 3,289,583 | 12/1966 | Silverman | 181/116 X |
| 3,323,611 | 6/1967 | Blayney | 181/116 X |
| 3,815,501 | 6/1974 | Anderson et al. | 102/24 R |
| 4,139,334 | 2/1979 | Payne et al. | 403/185 X |
| 4,166,417 | 9/1979 | Woodcock et al. | 102/24 R |

FOREIGN PATENT DOCUMENTS 316113  3/1934  Italy ......................................... 403/185

*Primary Examiner*—Peter A. Nelson
*Attorney, Agent, or Firm*—Daniel Silverman

[57] ABSTRACT

A linear explosive charge with constant detonation velocity, comprising a plurality of series-coupled explosive units or sticks. All sticks are identical and comprise a tubular member of selected length, with matched couplings. A helix of explosive cord is positioned around the tubular member, with ends inserted through openings into the interior of the tube and out through the couplings. At the top end of the stick a length of elastic tube is inserted, over the projecting cord, into the top coupling. When two sticks are to be coupled, the downward projecting cord of the top stick is inserted into the elastic tube along side the starting end of the cord of the second stick. This stretches the tube, which presses the two cords into intimate cross-detonation condition. Small ring-shaped concentrated explosive units can be inserted into the bottom end of the top stick over the explosive cord, as synchronous booster charges.

8 Claims, 4 Drawing Figures

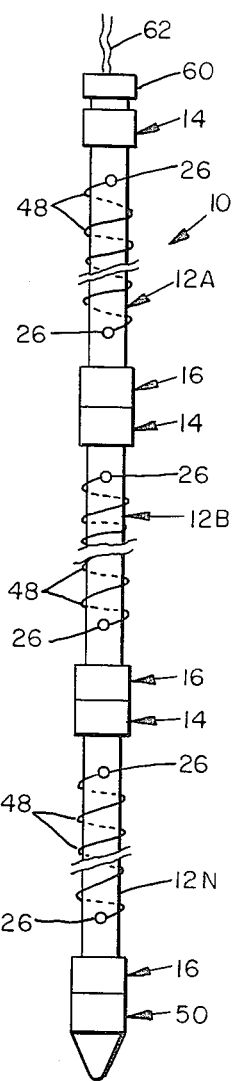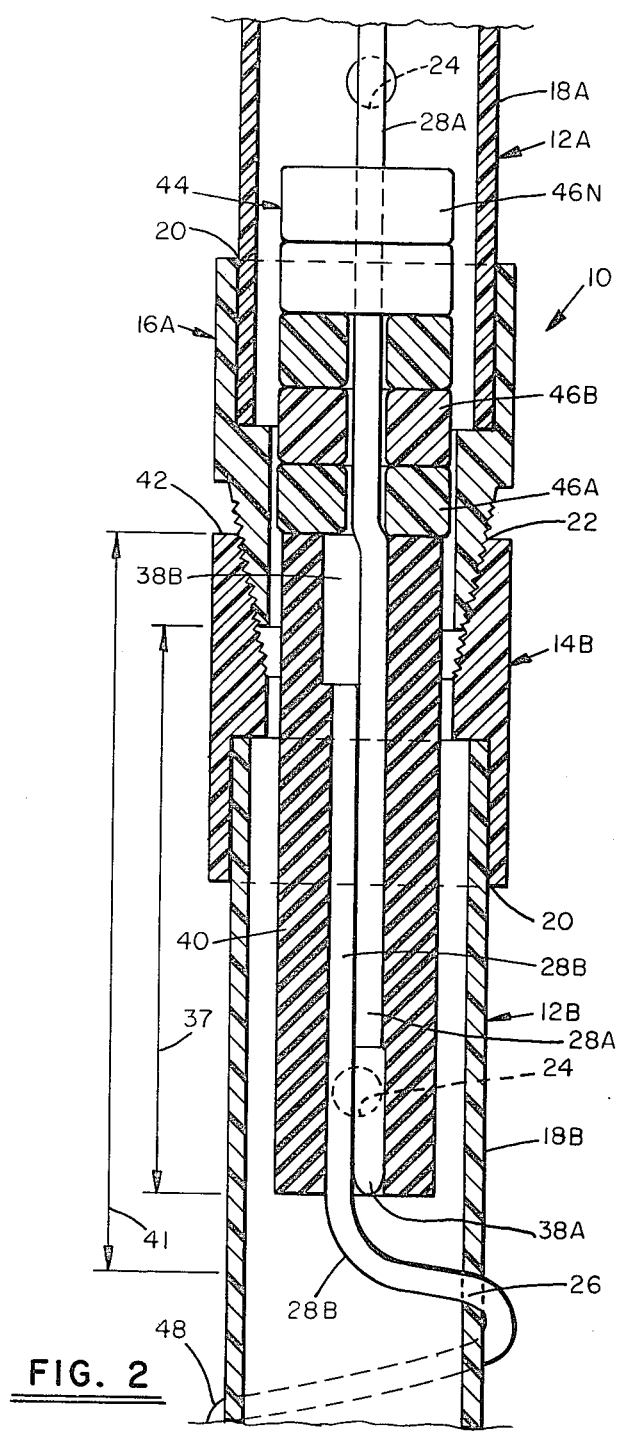
FIG. 1
FIG. 2

LINEAR EXPLOSIVE CHARGE WITH CONSTANT DETONATION VELOCITY AND SYNCHRONOUS BOOSTER CHARGES

BACKGROUND OF THE INVENTION

1. Field of the Invention

This invention relates to seismic geophysical surveying. More particularly it relates to a type of explosive charge known as a linear charge, a constant detonation-velocity charge, or a velocity-matching charge, in which the average velocity of detonation of the charge along its length, is substantially the same over equal increments of length of the charge.

Still more particularly it relates to a multi-unit, serially-connected charge, having improved means for detonating from one unit to the next, and including the provision of synchronously detonating booster explosive units, as the detonation wave passes the joints between each of the units.

2. Description of the Prior Art

In seismic geophysical surveying, wherein artificial seismic waves are created by detonating an explosive charge in the earth, and the resulting elastic or seismic waves are received by geophones, or other sensors, variously disposed on the earth's surface, it has become generally recognized that a long continuous explosive charge, or an array of many small point charges properly spaced and timed, such as to match the timing to the advancing of a seismic wave front through the adjacent earth medium, offers substantial advantages. Such elongated charges, or arrays, have directional properties, in that the created seismic waves travel in a preferred direction with maximum strength, and at the same time cause less unwanted disturbances travelling in other than the preferred direction.

In the prior art an example of the constant detonation velocity charge is described in U.S. Pat. No. 3,150,590 of Daniel Silverman. Use of this type of charge has been made in the geophysical industry where its particular advantages of directivity of energy delivery, and higher frequency content of the seismic energy, have proved useful in the solution of particular seismic problems.

However, a number of deficiencies and disadvantages of this particular design have been found, including high cost, and high weight. A less expensive version of this design utilized a paper tube, in place of the wood stick. But this had other more serious disadvantages. In particular, the charges lacked capability of submersion in water in the shotholes for long periods. More serious, however, was the occurrence of a great number of misfires; that is, failure to detonate from one explosive unit to the next.

There was a third serious disadvantage, that involved the use of concentrated explosive charges in the form of cans of explosive, that could be screwed in position at the couplings between the serial constant-velocity units.

In the use of constant velocity charges, there is a limit to the total weight of explosive that can be used on a charge of a given length. Although a given weight of constant velocity charge, because of its directivity, is equivalent, for seismic recording purposes, to several times that weight of concentrated point charge, sometimes additional explosive weight is needed. This was provided by inserting cans of concentrated explosive in some of the joints between units.

However the commercial cans of explosive were only available in substantial weight units. If only a small increment of charge weight was needed, the addition of 1 or 2 cans placed in the charge would spoil the directivity effect of the entire charge, and the principal advantage of the constant velocity charge would be lost.

BRIEF SUMMARY OF THE INVENTION

It is a primary object of this invention to provide a long, velocity-matching explosive charge, that will withstand longtime submersion in water without deterioration to the point of possible misfires.

It is a further object of this invention to provide a long, velocity-matching explosive charge made of many interconnected serial units that has reduced probability of misfires.

It is still a further object of this invention to provide a long velocity-matching explosive charge, the total charge weight of which can be augmented in small units of weight by the addition of small concentrated point charges at each of the junctions between serially connected units.

These and other objects are realized, and the limitations of the prior art are overcome in this invention by providing a velocity-matching charge which comprises a long, linear explosive charge having a plurality of serially connected units, or sticks. Each of the sticks is substantially identical, having the same length, the same coupling units on each end, the same weight of explosive cord, and the same length of explosive cord, thus providing the same time interval for the detonation wave to progress from one end of the stick to the other.

Each stick is made of plastic tubing, with threaded couplings of molded plastic. A hole is drilled at a selected distance from each end, through the wall of the stick. A selected length of explosive cord is wrapped in a helix, on the outer surface of the stick between the two holes. The turns of the helix are equally spaced, and the spacing is designed, in conjunction with the known velocity of detonation of the explosive cord, to provide a selected velocity of detonation from one end of the charge to the other. The two ends of the helix are inserted, one into each of the holes, to extend axially out of the couplings on each end.

For convenience, the end of the stick having the female coupling is considered the first end, and the cord is detonated at this end. The detonation then proceeds through the helix to the second end, with the male coupling.

A selected length of a thick-walled elastic tube, that can be made of foamed rubber or plastic, or equivalent, is positioned inside the first end of the stick, with the projecting end of the explosive cord passing axially up through the tube. The inner diameter of the tube is less than twice the outer diameter of the explosive cord. Thus, when the cord projecting from the second end of another stick is inserted into the tube in the process of joining two sticks, the elastic tube is stretched, and it provides compression along its full length, forcing the two ends of explosive cord into side-by-side intimate contact. This pressurized contact facilitates cross-detonation between the cords, and so prevents misfires.

Explosive units are provided, in small weights of explosive material comprising short thick rings, or doughnut-shaped elements of selected explosive material. In joining two explosive sticks, the second end, with the male coupling, of the first stick is inserted into, and coupled to the female or first end of the second stick, with the projecting second end of the explosive cord of the first stick inserted into the elastic tube, beside the first projecting end of the cord from the second stick.

Means are provided for inserting into the second end of the first stick, one or more of the explosive rings, surrounding the projecting cord, when the joint is made up. This same procedure is followed as each joint is made up. Since these explosive rings are detonated as the detonation wave of the cord passes, they can provide small or large increments of synchronous explosive weight to the charge.

BRIEF DESCRIPTION OF THE DRAWINGS

These and other objects and advantages of this invention, and a better understanding of the principles and details of the invention, will be evident from the following description, taken in conjunction with the appended drawing, in which:

FIG. 1 illustrates a view of the complete explosive assembly of this invention.

FIG. 2 illustrates in cross-section a view of the lower portion of one stick, coupled to the upper portion of a second stick.

DESCRIPTION OF THE PREFERRED EMBODIMENT

Figure 3:
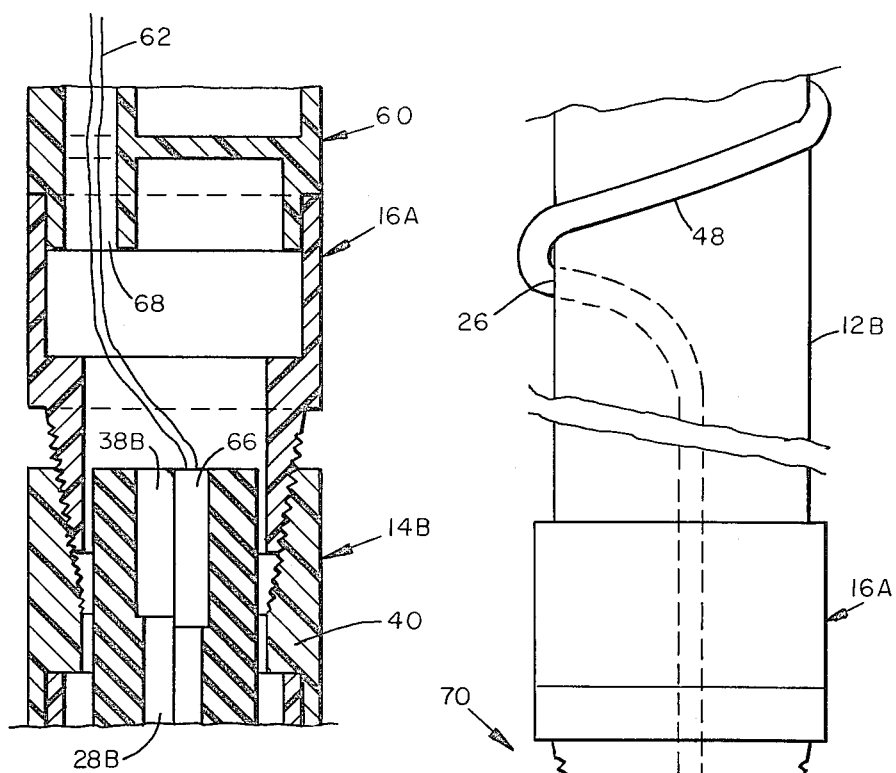
FIG. 3 illustrates the detonating end of the top stick of the explosive assembly of this invention.

Referring now to the drawings, and in particular to FIGS. 1 and 2, there is schematically illustrated one embodiment of this invention, indicated generally by the numeral 10. This explosive assembly is a long, linear assembly of a plurality of separate explosive units, or sticks, indicated by the numeral 12. These separate units 12A, 12B . . . 12N, are all identical and each includes a female coupling element at a first, or detonating end, and a male coupling element at the second end.

At the detonating end of the assembly is a "shield" or detonator element 60 coupled to the first stick 12A, into which a conventional electrical detonating cap can be inserted, attached to the cap leads 62, as is well known in the art. At the bottom end of the assembly, on the bottom end of the last explosive unit 12N, the open interior of the sticks is closed off with a "point" 50. This prevents the jamming of mud and dirt into the interior of the explosive units, and guides the assembly as it is lowered into the shot holes.

The main structure of the separate sticks comprises a long tube of thin-walled rigid construction. In order to reduce flotation, holes 24 are drilled near each end, through the wall, to permit the flow of water into and out of the interior space.

Referring now to FIG. 2, there is shown the coupling between two explosive units or sticks 12A, 12B. The lower end of stick 12A, is coupled to the top of a second stick 12B. The stick 12A comprises a plastic tube 18A, to the lower end of which is cemented 20 a male coupling 16A. The top of the second stick 12B comprises the plastic tube 18B to the top end of which is cemented 20 a female coupling 14B. Of course, the top end of stick 12A (not shown) will have a female coupling 14A, like 14B; and correspondingly, the bottom end of stick 12B (not shown) will have a male coupling 16B, like 16A, and so on.

At a selected distance from the end of the female coupling 14B is an opening 26 through the wall of the tubing 18B. A similar opening is present at a selected distance from the end of the male coupling. In between the two openings 26 is a helix 48 (shown more clearly in FIG. 1) of explosive cord, such as the commercial cord known as Prima Cord, manufactured by the Ensign Bickford Co. of Simsbury, CT 06070. This cord is manufactured in several sizes, including different selected weights of explosive material per unit length of cord. Since the name Prima Cord is well known in the industry, in describing this invention, the cord will be called; explosive cord, prima cord, or simply cord.

As the cord 28 is wound around the outer surface of the stick, it is held in place by an adhesive tape (not shown). The upper end of the cord is inserted through the opening 26 positioned at a selected distance 41 from the end of the stick, into the interior of the tube, and as 28B projects axially out through the center of the coupling 14B. The cord end is cut to a selected length, and the end is sealed against moisture by placing a brass or aluminum cap 38B over the end and crimping it in place.

At the bottom of the stick, the end of the cord 48 is inserted through the opening 26 (not shown) and down through the male coupling, similar to the cord 28A passing down through the coupling 16A. The end of this cord 28A is cut to a selected length 37, and the exposed end is covered with a brass cap 38A which is crimped in place.

Numeral 40 indicates a selected length of thick-walled elastic tube, made of foamed rubber or plastic. The outer diameter is such as to slip easily into the open end of the stick, through the female coupling 14B. The inner diameter is larger than the outer diameter of the cord 28, but is less than twice the diameter of the cord 28. Thus, when two ends of cord, one 28B proceeding upward from inside the stick, and the other one 28A inserted into the top of the tube, and pressed down, the tube will stretch and tightly bind the two cords together.

The tube 40 is inserted into the top of the stick, surrounding the upwardly extending end of cord 28B. The length of the tube is less than the distance 41, from the opening 26 to the end of the female coupling.

When two sticks are to be coupled, the bottom end 16A of the upper stick, (in the direction of the detonator) which has the extended end 28A of cord, is positioned coaxially with the second stick 12B. The sealed end 38A of the cord is inserted into the upper end of the tube 40, and is pressed down, until the male coupling 16A engages with the female coupling 14B. The upper stick is then rotated to tighten the threads of the coupling. When the joint is made up, that is, when the threads are tight and the two sticks are rigidly attached, the joint will be as pictured in FIG. 2, except for the rings of material 46A, 46B . . . 46N.

After a sufficient number of sticks are joined in this manner, and the charge is positioned in the shothole, the top end of the cord on the top stick is detonated, as will be described in connection with FIG. 3.

The explosive cord detonates at a known, constant, very high velocity of detonation, passing along the cord, out through the top opening 26, then along the helix, back in through the lower opening 26 to the lower end of the cord 28A. Inside of the tube 40, where the two ends of the cord are pressed together, the detonation of one cord cross-detonates the other cord 28B, and the detonation then passes down the second stick to the second coupling. There the detonation transfers to the cord on the third stick, and so on, until each of the serially connected sticks is detonated.

One important part of this invention is the provision of the elastic tube 40, which, when two sticks are coupled, serves to hold the two cords in tight side-by-side alignment, for the full length of the tube 40. This provides greater assurance of cross-detonation, and therefore freedom from misfires.

The detonating cord has a known constant rate of detonation. The cords on each stick are the same length L, so the time of travel of the detonation from one end of the cord to the other is known. Knowing the length of the stick, which is less than the length of cord, and the travel time, the average velocity of the seismic wave in the earth can be determined. By winding the helix with more or fewer turns this average velocity of seismic wave generation can be varied over a wide range, to match in any selected manner, the velocity of seismic waves in the earth along the length of the charge.

I speak here of an elongated, linear, explosive charge, which is the entire assembly of plural separate coaxially joined explosive sticks. In order to gain a maximum of benefit from this charge, it should be of considerable length, preferably of the order of 75 to 125 feet long, with a preferred value of at least 100 feet in length. Considering an average length of stick of 5 feet, this would require a charge constructed of twenty explosive sticks coupled end to end.

The total weight of explosive in such a charge is only a pound, or a few pounds, at most. Unfortunately, it is not possible to increase total charge weight by increasing the size of the explosive cord. The principal reason for this is that as the cord size increases, the probability of cross-detonation from one turn to another of the helix, increases. This places a practical limit on the maximum size (or charge weight) of the cord.

Consequently, in order to increase charge weight, the best way is to add small fixed charges of explosive. Of course, if say a 2 pound concentrated charge is added at one point in the charge, this will obscure the small progressive charge of the cord, and the directivity of the charge will be lost. What is required is to divide the two pounds of explosive into 20 pieces and to place one piece at each end of each of the sticks. Now, as the detonation of the cord progresses, each one of these small concentrated charges is synchronously detonated, in proper timing with the matched detonation velocity of the sticks.

Small concentrated charges of explosive can be made in the form of short thick cylinders or doughnuts. They are of a diameter that can fit up into the bottom end of the male coupling, surrounding the lower end of the cord 28A. Shown in FIG. 2 are 5 such small ring-shaped units 46A, 46B . . . 46N, indicated collectively as a concentrated charge 44.

As the detonation of the explosive cord 28A proceeds down from above, the charge 44 is detonated by the cord, and the shockwave from the detonation re-detonates the cords 28A and 28B, which then proceeds down the cord 28B and the helix 48, and so on.

The long straight length of cord 28B, from the charge 44 down to the start of the helix at the top opening 26, is very important. The detonation in the cord travels more rapidly than the velocity of the shock wave from the explosive 44. Thus the detonation wave outraces the shock wave and continues the detonation to the helix, and beyond. By this time, the shock wave is reduced in intensity and velocity, and has no opportunity to blow apart the explosive cord, which could happen if the shock could reach it first.

In FIG. 2, the dashed circles 24 are indicative of the vent holes through the wall of the sticks for flow of water from the shot hole into the interior of the sticks. This prevents a flotation effect that could cause the charge to rise in the shot hole.

Referring now to FIG. 3, there is shown a detonator unit indicated generally by the numeral 60. This is fitted and cemented into a male connector 16A and is adapted to be screwed into the top of the uppermost stick of the charge. However, before the unit 60 is attached, an electric detonating cap 66 attached to the firing leads 62 is inserted through the opening 68, and is pressed down inside the elastic tube 40 in side-by-side contact with the upper end 28B of the explosive cord termination 38B. The unit 60 is then screwed down tight, and the leads 62 are made fast around the end of the charge, in a conventional manner. The charge is now primed, ready to be lowered into the shot hole and detonated when desired.

Figure 4:
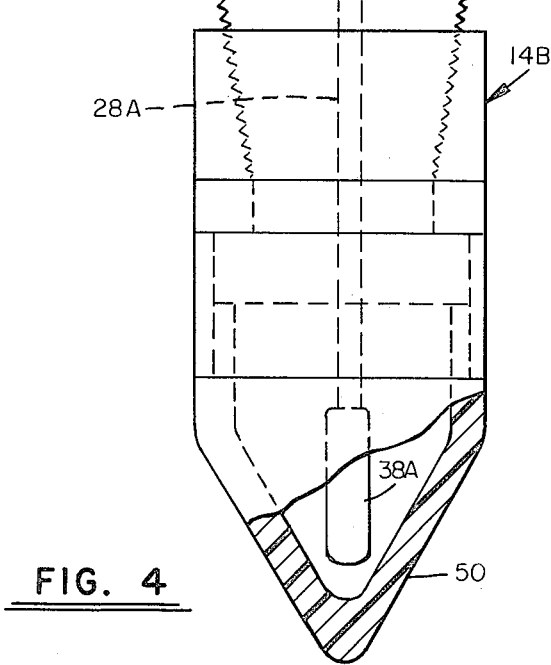
FIG. 4 illustrates the bottom end of the lowermost stick.

Referring now to FIG. 4 there is shown the point termination of the explosive charge, indicated generally by the numeral 70. It is shown attached to the bottom end, male coupling 16A of the bottommost stick of the charge. This unit 70 is designed to cover the opening in the bottom end of the charge, and to protect the downwardly extending end 38A of the cord 28A. The shield 50 serves to guide the charge as it is lowered into the shot hole.

While I have illustrated the couplings between each unit as a threaded coupling, this is only by way of example and any other type of rigid coupling can be used to rigidly fasten the sticks together.

While the invention has been described with a certain degree of particularity, it is manifest that many changes may be made in the details of construction and the arrangement of components. It is understood that the invention is not to be limited to the specific language used or the specific embodiments set forth herein by way of exemplifying the invention, but the invention is to be limited only by the scope of the attached claim or claims including the full range of equivalency to which each element or step thereof is entitled.

I claim:

1. A linear explosive charge with constant detonation velocity, comprising;
(a) a plurality of series-connected units, or sticks, and means to colinearly join said sticks together in a long linear substantially rigid assembly;
(b) each stick comprising;
 (1) a tubular member of selected length and diameter;
 (2) a polarized coupling attached at each end, a female coupling at one end, and a male coupling at the other end;
 (3) a helical winding of linear explosive cord on the outside surface of said tubular member, near each end of said stick, said explosive cord inserted through an opening in the wall of said stick, with the ends of said cord extending outwardly through said couplings for selected distances;
 (4) at the end having the female coupling, a selected length of thick-walled elastic tube inserted over the end of said explosive cord into the end of said stick; the inner diameter of said tube less than twice the diameter of said explosive cord;
whereby when the end of said cord extending from the male end of a first stick is inserted into said elastic tube inside the female coupling of a second stick, as the joint is made up, said elastic tube will expand and press both ends of the explosive cord together in tight side-by-side contact to facilitate the process of cross-detonation from the cord on one stick to the cord on the other stick.

2. The explosive charge as in claim 1 and including;

(a) at least one solid booster explosive unit made of selected explosive material, in the shape of a thick-walled short tube or doughnut, the inner diameter greater than the diameter of said explosive cord; and (b) means to position at least one of said booster explosive units into the bottom end coupling of a first stick, surrounding the explosive cord therein, before said cord extending from said male coupling end is inserted into said elastic tube inside the female end at the top of a second stick.

3. The explosive charge as in claim 2 and including;

(a) at least two sticks in series, joined in colinear connection, with the male coupled second end of the first stick coupled to the female coupled first end of the second stick, with the detonation progressing from the first end of the first stick to the second end of the first stick, to the booster charge, to the first end of the second stick, and so on; and wherein (b) said booster explosive unit is positioned in the second end of the first stick, which is spaced by the selected length of said elastic tube from the beginning of the helix of explosive cord near the first end of said second stick;

whereby a linear axial length of explosive cord, of selected length, will be provided to carry the detonation of the booster explosive unit to the start of the helix;

whereby this selected straight length of explosive cord will permit the detonation to out run the shock wave from the booster detonation.

4. The explosive charge as in claim 1 in which said polarized couplings comprise threaded couplings.

5. The explosive charge as in claim 1 including a detonator unit coupled into the top coupling of the top stick of the charge.

6. The explosive charge as in claim 1 including a pointed closure unit closing of the bottom end of the bottom stick of said charge.

7. The explosive charge as in claim 1, in which said explosive cord is of the type known as Prima Cord.

8. The explosive charge as in claim 1 in which the spacing between turns of the helix of said explosive cord is a function of the desired detonation velocity of said explosive charge.

* * * * *